April 29, 1941.  J. P. BADARACCO  2,240,454
CULINARY UTENSIL
Filed May 14, 1940  2 Sheets-Sheet 1

Inventor
JOHN P. BADARACCO
By L. Edw. Flaherty
Attorney

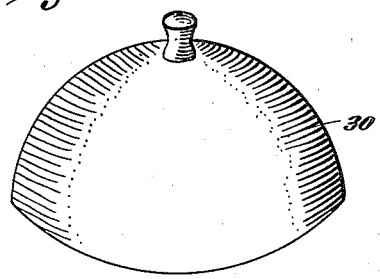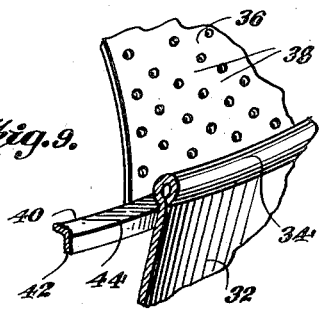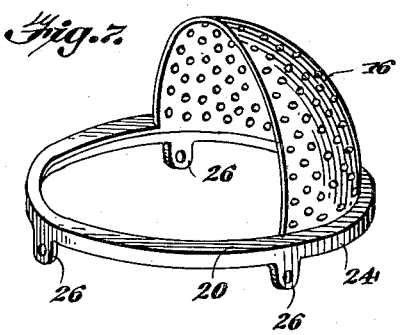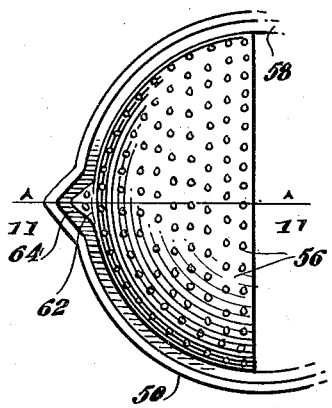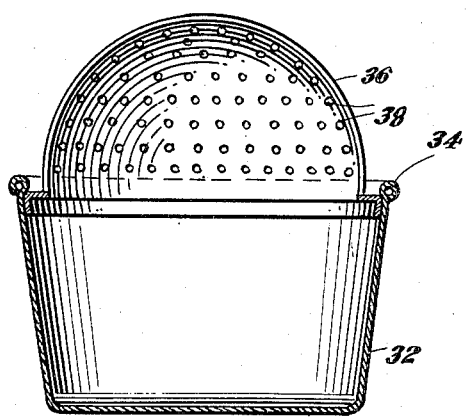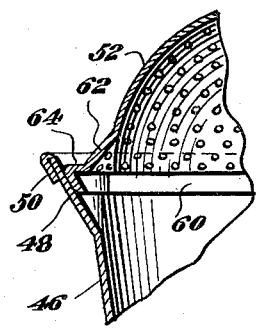

Patented Apr. 29, 1941

2,240,454

UNITED STATES PATENT OFFICE 2,240,454

CULINARY UTENSIL

John P. Badaracco, Union City, N. J., assignor of fifty per cent to Promethis Carnecchia, Union City, N. J.

Application May 14, 1940, Serial No. 335,174

6 Claims. (Cl. 53—8)

The present invention relates to improvements in culinary utensils.

The primary object of the invention is to provide a strainer element for pots and pans which will allow the contents of the pot or pan to be strained and drained by merely tilting the pan.

A further object of the invention is to provide a combined cooking utensil and strainer associated with the top of the pan in such a manner as to be held thereon as a permanent fixture whereby the strainer will be in position at all times for use and will not become displaced or separated and lost during use.

Other objects and advantages of the invention will become apparent during the course of the following description of the invention and the accompanying drawings wherein:

Figure 6 is a perspective view of the cover or lid for the pot.

Figure 7 is a perspective view of the strainer removed from the pot or pan.

Figure 8 is a vertical cross sectional view illustrating a modified form of the invention.

Figure 9 is an enlarged perspective view of the modified strainer shown in Figure 8.

Figure 10 is a further modification illustrating in top plan the strainer applied to a receptacle having a pouring lip, and, Figure 11 is a vertical cross sectional view taken on line 11—11 of Figure 10 looking in the direction of the arrows illustrating the pouring lip projection on the strainer.

Figure 1:
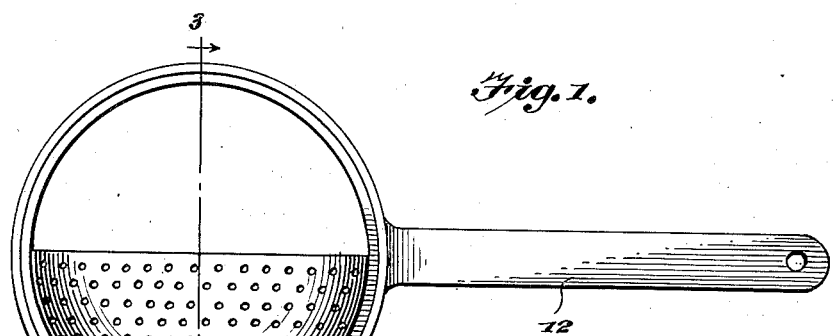
Figure 1 is a top elevational view of a preferred embodiment of the invention.
Figures 2, 3:
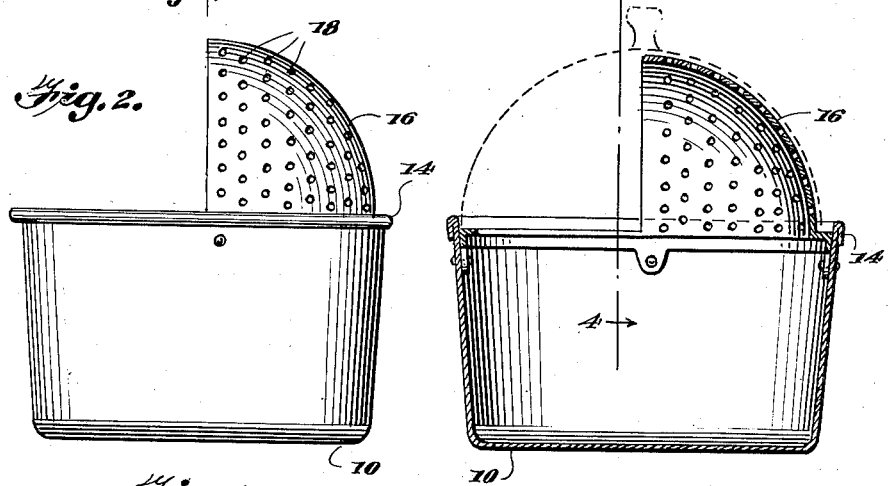
Figure 2 is an end elevational view of the same showing the strainer in position on the pan.
Figure 3 is a vertical cross sectional view taken on line 3—3 of Figure 1 looking in the direction of the arrows illustrating the strainer in position on a pot or pan.
Figures 4, 5:
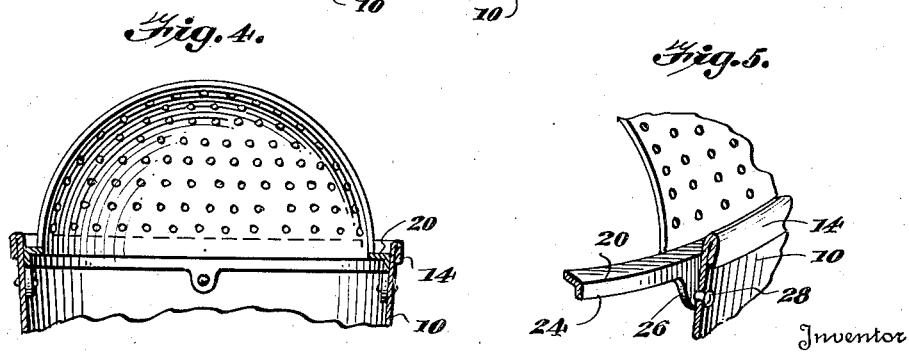
Figure 4 is a vertical cross sectional view taken on line 4—4 of Figure 3, looking in the direction of the arrows further illustrating in detail the shape and arrangement of the strainer.
Figure 5 is a perspective view greatly enlarged showing a portion of the strainer and the manner in which it is attached to the pot.

In the drawings, wherein for the purpose of illustrating the invention and wherein like reference characters will be employed to designate like parts throughout the same, attention is directed to Figures 1 to 7 inclusive wherein the reference character 10 will generally be employed to designate a pot or pan having a handle 12 and a return bent beaded portion 14.

The invention comprises a perforated quadrant shaped strainer element 16 having a series of equidistant apertures 18 formed therein.

An annular ring 20 is connected to the perforated quadrant 16 and is provided with a flanged portion 24 adapted to be received in the upper end of the pot or pan 10. Spaced lugs 26 are formed on the annular flange 24 and are adapted to be anchored to the pot or pan 10 by rivets or screws 28 as shown clearly in Figures 3 to 5 inclusive.

A spherical lid or cover 30 is provided for the pot or pan 10 so that the same will be completely covered and the strainer element 16 will be confined and housed therein.

In Figures 8 and 9, the pot or pan 32 is provided on its upper end with a tubular bead 34 and the strainer element 36 is substantially identical to the strainer element shown in Figures 1 to 7 inclusive and includes a quadrant shaped spherical member 36 having a series of spaced apertures 38 formed therein for the passage of the liquid contents of the pan 32.

Formed on the quadrant shaped spherical member 36 is an annular ring 40 having a downwardly and inwardly extending flange 42 for being snugly fitted within the upper end of the pan so that the angle portion 44 of the annular ring will fit behind the tubular bead 34.

In the further modified form of the invention, a receptacle 46 such as a teapot or the like is provided with a pouring lip 48 and a return bent beaded edge portion 50. The strainer element 52 is formed from a spherical quadrant and is perforated as at 56 for allowing the passage of the contents of the pot 46. An annular ring 58 is formed on the quadrant shaped spherical member and is provided with a downwardly and inwardly extending flange 60 for snugly fitting within the teapot or receptacle 46. Formed on the quadrant spherical member 52 is a pouring lip projecting portion 62 merging in a continuation 64 of the annular ring 58. The ring continuation 64 is flanged as at 68 to snugly fit in the lip or pouring spout 48 of the receptacle.

It is to be understood that the semi-spherical cover 30 may cover all forms of the strainers as shown in Figures 1 to 5 and 7 to 11 respectively.

It is also to be understood, that the forms of the invention herewith shown and described are to be taken as preferred embodiments of the same and that various changes in the shape, size and arrangement of parts may be resorted to without departing from the spirit of the invention or the scope of the subjoined claims.

What I claim is:

1. A cooking utensil, comprising a receptacle having a beaded rim, a supporting ring located within the beaded rim portion of the receptacle, a spherical sector shaped strainer carried by the supporting ring extending above the beaded rim and means for holding the supporting ring in place.

2. A cooking utensil, comprising a receptacle having a beaded rim, a supporting ring located within the rim, a spherical sector shaped strainer element formed integral with the rim and a semi-spherical cover for the strainer and receptacle.

3. A cooking utensil, comprising a receptacle having a beaded rim, a supporting ring anchored within the rim, a spherical sector shaped strainer formed on the supporting ring and extending above the beaded rim and a semi-spherical cover engaging the rim and enclosing the spherical sector shaped strainer.

4. A cooking utensil, comprising a receptacle having a beaded rim, a flanged supporting ring mounted within the beaded portion of the receptacle, lugs formed on the flanged ring, rivets extending through the receptacle and lugs and a spherical sector shaped strainer formed integral with the supporting ring and extending thereabove.

5. A cooking utensil, comprising a receptacle having a beaded rim, a supporting ring frictionally held in the beaded rim portion of the receptacle and a spherical sector shaped strainer formed integral with the supporting ring.

6. A cooking utensil, comprising a receptacle having a beaded rim and a pouring lip, a supporting ring having a projection for being received in the receptacle and pouring lip and a spherical sector shaped strainer formed integral with the supporting ring.

JOHN P. BADARACCO.